United States Patent [19]
Adams et al.

[11] Patent Number: 5,833,851
[45] Date of Patent: Nov. 10, 1998

[54] METHOD AND APPARATUS FOR SEPARATING AND DELIQUIFYING LIQUID SLURRIES

[76] Inventors: Joseph L. Adams, 1668 Estevan Road, London, Ontario, Canada, N5X 2G9; Donald F. Perry, 80 Lynngate Place, London, Ontario, Canada, N6K 1S5

[21] Appl. No.: 745,055

[22] Filed: Nov. 7, 1996

[51] Int. Cl.$^6$ .............................. B30B 9/18; B30B 9/12; B01D 29/64; B01D 29/94

[52] U.S. Cl. .......................... 210/413; 210/415; 210/767; 210/791; 110/117; 110/145; 110/147; 110/148; 110/37

[58] Field of Search ..................................... 210/413, 414, 210/415, 770, 791, 767; 100/117, 145, 43, 37; 110/147, 148

[56] References Cited

U.S. PATENT DOCUMENTS

| | | |
|---|---|---|
| 3,111,082 | 11/1963 | Larsson . |
| 3,235,087 | 2/1966 | Andrews ................................. 210/415 |
| 3,982,483 | 9/1976 | Bird . |
| 4,117,776 | 10/1978 | Hunt . |
| 4,214,377 | 7/1980 | Maffet . |
| 4,260,488 | 4/1981 | Condolios ............................... 210/259 |
| 4,291,619 | 9/1981 | Hunt . |
| 4,520,724 | 6/1985 | Costarelli . |
| 5,009,795 | 4/1991 | Eichler ..................................... 210/744 |

Primary Examiner—Thomas M. Lithgow
Attorney, Agent, or Firm—Eileen M. McMahon

[57] ABSTRACT

A screw press separator is provided herein for separating and deliquifying a slurry of solids and liquids e.g., a slurry of manure and water, or any other slurry of similar physical characteristics. The separator includes a cylindrical housing having a slurry inflow port. A cylindrical strainer basket extends rearwardly from the housing for the passage of separated liquid therethrough. A cylindrical discharge chamber extends rearwardly from the outlet end of the strainer basket to define a solids discharge opening. A motor driven auger is disposed within the housing and the strainer basket, the auger including a shaft extending through the housing, through the strainer basket and through the cylindrical discharge chamber, for driving the auger for advancing the slurry rearwardly within the cylindrical housing. A spring-loaded door assembly which is connected to the shaft, is provided at the exit of the cylindrical discharge chamber. The liquid is removed through the strainer basket and the residual solids are formed into a solid plug. The solid plug is advanced through the cylindrical discharge chamber, but is prevented from rotating by keystocks situated within the cylindrical discharge chamber. Because of the rotation of the auger shaft, the spring-loaded door assembly also rotates. The door assembly is provided with longitudinally-extending tearing bolts to break up the plug. Discrete solids are thereby discharged through the solids discharge opening between the end of the cylindrical discharge chamber and the forward end of the rotating door assembly.

6 Claims, 4 Drawing Sheets

METHOD AND APPARATUS FOR SEPARATING AND DELIQUIFYING LIQUID SLURRIES

BACKGROUND OF THE INVENTION (i) Field of the Invention

The invention relates to a method and apparatus for the separation and dewatering of a slurry of solids contained in liquid (e.g., water) in various concentrations. Such solids may be in the form of a manure slurry or may originate in industrial processes, or in animal-intensive operations for processing animals or their parts or plants, and mixed with fibres, e.g., animal hairs or vegetable fibres. Such slurries all have the same general physical characteristics.

It has long been recognized that it would be advantageous to remove water mechanically from various solids and by-product sludge, such as, for example, sewage sludge and fluid manure slurries. The use of mechanical dewatering would reduce the weight of material to be disposed or transported or the amount of water to be evaporated during various thermal drying steps often employed in the production of solid fertilizers or soil conditioners. Many different types of mechanical dewatering apparatus have been developed, but none is believed to have gained widespread usage and acceptance.

(ii) Description of the Prior Art

One of the simplest machines for the separation of solids and liquid is the screw press separator, wherein the screw turns within a progressively narrowing housing toward the discharge for achieving a gradual compression of the solids being separated. However, the operation of such machines in actual practice showed that the narrowing sections had a detrimental effect on the throughput, the field of application and the flexibility of the screw press separator. Whenever the quantity of the introduced mixture or its consistency varied, for example, due to a variation of the content of fibrous solids, the solids were compressed in the narrowing areas, with the result that the separator became clogged.

One attempted solution to this problem was providing for the passage of the released water through the housing wall to a strainer basket of reduced diameter, so that a counter pressure could be built up. Although in such separator the uniform screw driven toward the discharge did dewater the aqueous suspension, no compression effect was provided to obtain a high proportion of the dry substance.

Screw-type finishers, wherein the conveying means comprised a screw or auger of relatively high pitch, were also commonly used to separate liquids from solids. Such finishers provided increased axial forces for conveying large amounts of solids through the finisher. However, it was found that such screw finishers did not provide adequate drying action for finishing admixtures of the type referred to above, wherein it is extremely important to remove essentially all of the liquid or liquor from the solids.

In the patent literature, U.S. Pat. No. 3,235,087 patented Feb. 15, 1966 by R. A. Andrews et al, provided an apparatus for separating liquids from solids. The apparatus included a housing having end walls with an inlet in one of the end walls and an outlet in the other of the end walls. A cylindrical screen was mounted within the housing and extended between the end walls. An impeller member was mounted for rotation about an axis in the housing and within the confines of the screen. The impeller member included a cylinder member extending between the end walls. A screw was carried on the cylinder member, the screw having a plurality of flights, the flights extending from a point short of the inlet to an intermediate point between the end walls. The impeller member further included a paddle extending from the intermediate point to a point adjacent the outlet means. The paddle was of helical configuration but it extended generally longitudinally with respect to the axis. The last of the flights changed pitch and merged into the paddle. Thus the screw and the paddle defined cylindrical surfaces of revolution closely spaced from the inside surface of the screen. A motor provided rotation of the impeller member in a direction to cause solids to be conveyed from the inlet means to the outlet means.

U.S. Pat. No. 4,214,377 patented Jul. 29, 1980 by V. Moffet provided a mechanical dewatering process. That dewatering process included the steps of passing a feed stream of organic solids into the first end of a cylindrical chamber dewatering zone having a cylindrical porous wall, with the inner surface of the porous wall being attached to longitudinal support rods which extended from the first end to the second end of the porous wall. The feed stream was pressurized to a super atmospheric pressure by rotating a centrally-mounted screw conveyor which extended between the first end and a second end of the dewatering zone while constricting the opening at the second end of the dewatering zone. The blade of the screw conveyor had a helical outer edge which was separated from the inner surface continuous and unagitated cylindrical layer of filter media comprising fibres derived from the feed stream was maintained in an annular space located between the inner surface of the porous wall and the outer edge of the screw conveyor. Simultaneously, organic solids were transferred through the centre of the dewatering zone from the first end to the second end of the dewatering zone. Water was withdrawn radially from the dewatering zone through the porous wall and the cylindrical layer of filter media. A dewatering zone effluent stream having a higher organic solids content than the feed stream was withdrawn from the second end of the dewatering zone.

U.S. Pat. No. 4,260,488 patented Apr. 7, 1981 by E. Condolios provided a device for compacting and draining fluid sludge containing fibrous materials. Such device included a vertical vessel including an upper cylindrical portion and a lower conical portion. A supply pipe for the sludge to be treated extended tangentially at a level below the top of the cylindrical portion of the vessel. A plurality of rotating perforated blades having a vertical axis was installed in the cylindrical portion below the supply pipe. A conical rotating screw having a vertical axis was installed in the conical portion of the vessel. The conical screw included at least one blade having a pitch correlated to the fibrous sludge to be treated so that compressed sludge at this level was not solidified and still contained interstitial water. The conical portion had a lower end with an outlet orifice for compressed sludge. A spillway was provided at the upper end of the cylindrical portion of the vessel for the discharge of a part of the interstitial water contained in the sludge. A horizontal cylindrical chamber was secured to the conical portion of the vessel at the outlet orifice. That chamber included a downstream portion having a wall constituted as a grating for the discharge of remaining interstitial water contained in the sludge. A rotating screw was installed in the chamber and extended beneath the outlet orifice. The chamber had an outlet orifice at an end thereof for discharge of compacted sludge. A flexible outlet was provided at the orifice, the outlet having a conical shape and a free end with an outlet diameter which was smaller than its inlet diameter.

U.S. Pat. No. 4,520,724 patented Jun. 4, 1985 provided a screw drier for plastic materials. That drier consisted of a support chassis or casing and a normal screw of known screw conveyor type in a cylindrical channel on top. At one end of the channel, the screw was supported and rotated via tapered roller bearings. The remaining, longer section of the screw was suspended. The first section of the screw shaft was solid to withstand the stresses of the support in rotation. The second section of the shaft was equipped with helical vanes or turns, for its entire length, and was hollow to lighten it. The third and final section was also hollow, and had openings which allowed the water expelled from the inside of the material being dried to come out through the inside of the shaft rather than through the openings in the casing of the drier.

The material to be dried was introduced from above through a hopper in the channel of the drier, and was advanced by the screw conveyor for a distance equal to the opening of the hopper. In the next section of the drying channel near the outlet, the material was pressed out without the aid of the vanes of screw. Therefore, the shaft of the screw was equipped with turns only in the section between the flanges connecting the hopper to the drying channel, corresponding to the entrance. The final turn of the screw went beyond the flanges connecting the hopper to the drying channel, corresponding to the entrance. The entire section of the last turn was thicker than the other turns. The increased thickness began at the shaft and tapered off toward the top, so that the turn had a truncated conical section. Water was expelled through multiple openings in the drier casing corresponding to the outlet section downstream from the flanges connecting the input hopper. To facilitate water expulsion in the high pressure area, a fairly dense distribution of openings was provided in the area extending from the flange connecting the inlet hopper to just beyond the section of the last turn, descending at 90° to the shaft. The high pressure area thus began immediately after the last turn, and it is here that most water is expelled. The distribution of the openings may be less dense in the next section. In order to facilitate compression inside the drying channel, contraction devices are provided at its outlet consisting of a fixed collar, shaped like a truncated cone, applied along the terminal peripheral edge and tapering toward the inside. A hinged flap door adjustable in height at the top edge of the channel, was also provided. The flap door cooperated with the collar to slow the advance of the material by reducing the diameter of the channel at the outlet.

U.S. Pat. No. 4,291,619 patented Sep. 29, 1981 by A. J. Hunt et al provided a screw press with controllable rear door. The press utilized an elongate cylindrical barrel or cage divided into a feed and pressure section and a pressing chamber section. The walls of the pressing chamber section and of a portion of the feed and pressure section were formed from a filter screen through which extracted liquids could pass. The feed and compression screw was formed from a cylindrical body having large pitch spiral threads attached thereto and disposed in the feed and pressure section of the press barrel. A concentric drive shaft through the screw body was utilized to turn the feed screw via a hydraulic drive unit. The front portion of the feed and pressure section was an enclosed inlet region with an inlet opening at the top thereof to allow gravity feed of materials into the press.

A circular door was disposed at the end of the pressing chamber, such door having tapered edges mating with an opening in the chamber and bulkhead. The circular door was slidably engaged with the feed and pressure screw drive shaft which extended through the door and was supported at its outer end by a bearing frame or pillow block. External inward pressure on the door will therefore maintain the door tightly closed until outward pressure from inside the chamber overcame the external pressure and forced the door to slide rearward along the drive shaft. An hydraulic pressure system was used having hydraulic actuators attached to the rear frame of the press with their actuating rods applying pressure to the rear door through a throw-out type bearing assembly. Hydraulic pressure was applied to the hydraulic actuator pistons in a direction to force the rods outward. An adjustable pressure relief valve was connected between the inlet and outlet lines of the hydraulic actuators suitable to relive at a selected pressure above that applied to the actuators. Thus, when the pressure of the material in the pressing section of the barrel against the inner surface of the door exceeded the hydraulic pressure such that the relief valve bypassed, the door would be forced backward along the drive shaft allowing the material to extrude out of the opening in the rear plate in the form of a highly compressed plug or log. The door also included a plurality of cutter bars attached and projecting from its inside surface. As the door was opened by the internal pressure, a clutch switch was mechanically closed, causing an electric clutch anchored to the drive shaft and to the door to engage, thereby rotating the door at the speed of the drive shaft. The cutters then pared away the compressed plug or log which built up in the pressing section during operation, allowing the chips to be collected and carried away.

U.S. Pat. No. 5,009,795 patented Apr. 23, 1991 by D. Eichler, entitled "Process for the Dewatering of Solids Suspended in Water and Screw Press Separator Therefor", was alleged to provide an improvement in such screw press separators. The basic concept of that invention involved a change in the formation and shape of the solid plug, in order to obtain an operation free of interference of the machine, independently of different types of liquid manure and fluctuations in mixture consistency. The solid plug was located in all stages of dewatering in a cylindrical strainer basket, and the screw press separator was configured so that no solids could accumulate between conical or tapering parts. The necessary counter pressure acting on the plug was built up by the internal stressing of the compressed elastic solids by friction against the walls the friction directed parallel to the direction of advancement of the plug. The plug began to form rearwardly of the straining basket under a rising pressure which increased from the outlet of the helical screw to the end of the straining basket and then declined toward the solids discharge opening. This pressure rise in the part of the straining basket after the plug left, the screw was essential for the further dewatering of the solids retaining on the straining surface.

SUMMARY OF THE INVENTION (i) Aims of the Invention

It is seen that the above patented solutions did not fully solve the problem. Accordingly, an object of the present invention then, is to broaden the field of application and improve the flexibility of the aforedescribed types of screw press separators, to increase the dry substance content of the solids, and to provide a novel and structurally-superior means for building up the necessary counter pressure acting on the solid plug.

Another object of the present invention is to provide such apparatus which is extremely simple and rugged in construction and adapted to be manufactured economically.

(ii) Statements of Invention

The present invention provides a screw press separator for separating and deliquifying a slurry of solids and liquids comprising: a cylindrical housing; a radial inlet means for the inflow of the solids-containing liquid slurry into the cylindrical housing; a cylindrical strainer basket extending rearwardly within the housing, the strainer basket having a cylindrical outlet end and apertured cylindrical walls for the passage of separated liquid therethrough; a cylindrical discharge chamber extending rearwardly from the outlet end of the strainer basket and defining a solids discharge opening at a terminal end thereof, the cylindrical discharge chamber being provided with longitudinally-extending members serving to prevent a plug of solids situated therein from rotating; an auger disposed both in the cylindrical housing and in the strainer basket, the auger including a shaft extending through the housing, through the strainer basket and through the cylindrical discharge chamber, and auger flights affixed to an outer periphery of the shaft, the auger flights beginning in the housing at a location communicating directly with the radial inlet means and terminating adjacent the terminus of the strainer basket; a spring-loaded door assembly at the exit of the cylindrical discharge chamber, the door assembly being operatively-connected to the shaft of the auger so that the door assembly rotates with the shaft, the inner face of the upstream end of the door assembly being provided with a plurality of longitudinally-extending, disintegrating members, the door assembly being movable between a blocking position in which it blocks the solids discharge opening, and an unblocking position in which it provides such solids discharge opening; and a motor for driving the auger for advancing the solids-containing liquid slurry rearwardly within the cylindrical housing and through the strainer basket to separate the liquid from the solids, to pass such liquid through the strainer basket and to propel solids in the form of a plug into the cylindrical discharge chamber; whereby the solid plug which is so-formed is then discharged, in the form of discrete particles, by way of the spring-loaded door assembly at the solids discharge opening.

The present invention also provides a method for separating and deliquifying solids contained in a slurry, comprising the steps of: A) introducing the slurry into a screw press separator, the screw press separator comprising a cylindrical housing, a radial inlet means for the inflow of the solids-containing liquid slurry into the cylindrical housing, a cylindrical strainer basket extending rearwardly within the housing, the strainer basket having a cylindrical outlet end and apertured cylindrical walls for the passage of separated liquid therethrough, a cylindrical discharge chamber extending rearwardly from the outlet end of the strainer basket and defining a solids discharge opening at a terminal end thereof, the cylindrical discharge chamber being provided with longitudinally-extending members therein, an auger disposed both in the cylindrical housing and in the strainer basket, the auger including a shaft extending through the housing, through the strainer basket and through the cylindrical discharge chamber, and auger flights affixed to an outer periphery of the shaft, the auger flights beginning in the housing at a location communicating directly with the radial inlet means and terminating adjacent the terminus of the strainer basket, a spring-loaded door assembly at the exit of the cylindrical discharge chamber, the door assembly being operatively-connected to the shaft of the auger so that the door assembly rotates with the shaft, the inner face of the upstream end of the door assembly being provided with a plurality of longitudinally-extending disintegrating members, the door being movable between a blocking position in which it blocks the solids discharge opening, and an unblocking position in which it provides the discharge opening, and a motor for driving the auger for advancing the solids-containing liquid slurry rearwardly within the cylindrical housing and through the strainer basket to separate the liquid from the solids, to pass such liquid through the strainer basket and to propel solids in the form of a plug into the cylindrical discharge chamber; B) rotating the auger to advance the slurry into the strainer basket, thereby to separate the liquid from the solids, to pass such liquid through the strainer basket and to propel solids in the form of a plug into the cylindrical discharge chamber; C) preventing such solid plug in the cylindrical discharge chamber from rotating; D) urging the plug to pass into the cylindrical discharge chamber to apply a predetermined force to the spring-loaded door assembly; E) disintegrating the plug by means of the disintegrating members on the interior face of the upstream face of the door assembly which is rotating along with the auger; and F) removing discrete solids through the space between the end of the cylindrical discharge chamber and the front face of the upstream face of the upstream plate of the rotating spring-loaded door assembly.

(iv) Other Features of the Invention

By one feature of the screw press separator of this invention, the cylindrical discharge chamber is provided with a plurality of longitudinally-extending keystocks as the members which prevent rotation of the plug of solids.

By another feature of the screw press separator of this invention, the spring-loaded door assembly comprises two plates separated by spring members which are, in turn, fixed to each of the plates, the upstream plate being adapted to be slidable with respect to the shaft, and the downstream plate being secured to the shaft.

By a feature of this feature of the screw press separator of this invention, the spring members are manually adjustable to vary the compressive resistive thereof, to vary the extent to which the plug is compacted by resistive pressure of the door assembly. By another feature of this feature of the screw press separator of this invention, the longitudinally-extending disintegrating members on the upstream plate comprise a plurality of tearing bolts.

By another feature of the screw press separator of this invention, the apertured cylindrical walls of the strainer basket comprise longitudinally-slotted screen elements.

By yet another feature of the screw press separator of this invention, the screw press separator includes a cylindrical chamber concentrically surrounding the strainer basket to provide a concentric mantle therearound for the accumulation of liquid therein, the mantle including a liquid outlet means therefrom.

By one feature of the method of this invention, the method includes the steps of: providing the spring-biased door with spring means for controllably moving the door between a blocking position in which it blocks the solids discharge opening, and an unblocking position in which it provides the solids discharge opening; biasing the door toward the blocking position by means of the spring means; and adjusting the spring means to vary an initial compressive force applied by the door assembly to the plug to vary the extent to which the plug is compacted.

BRIEF DESCRIPTION OF THE DRAWINGS

In the accompanying drawings.

Figure 1:
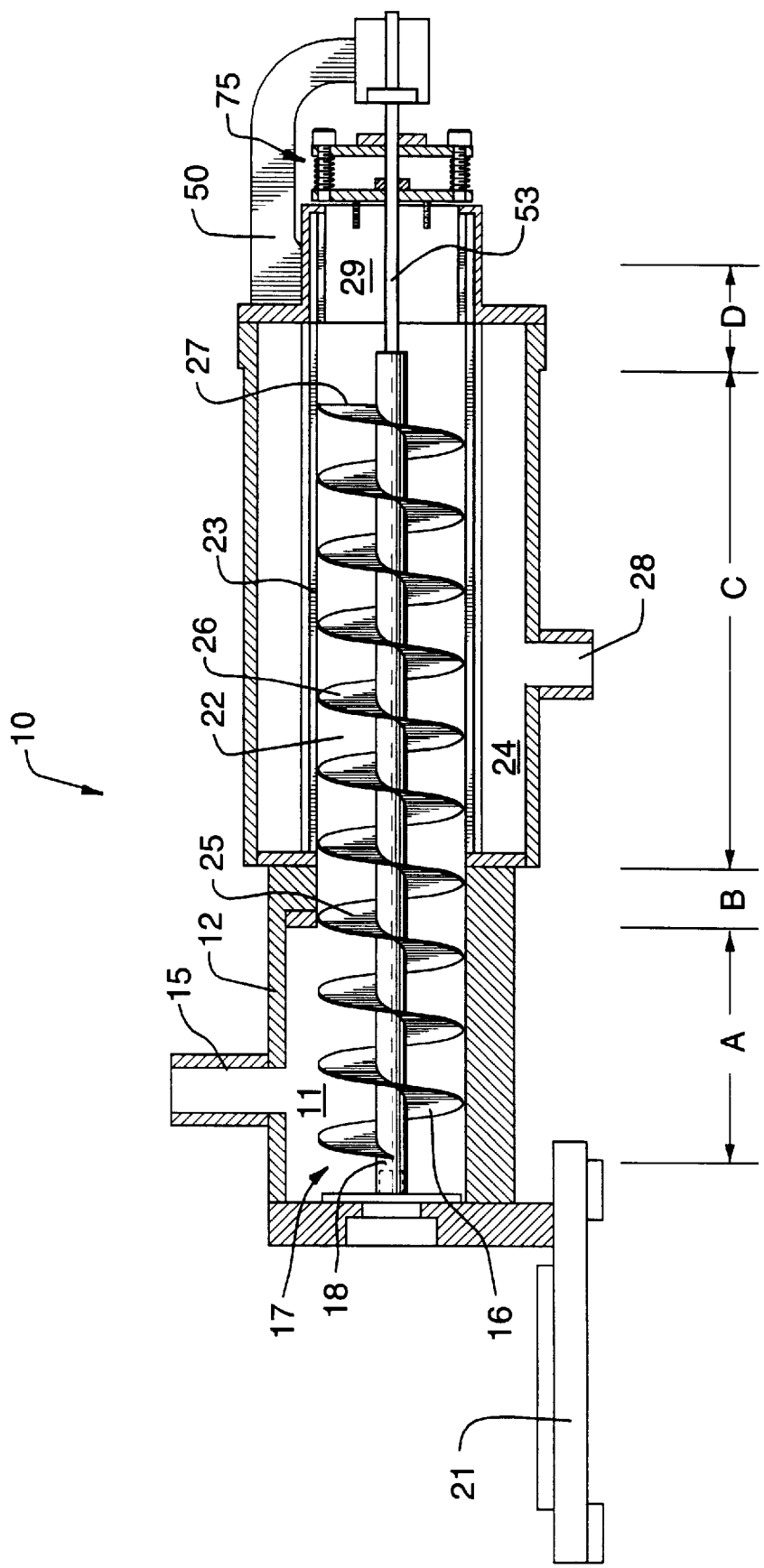
FIG. 1 is a longitudinal section through a screw press separator according to the invention.
Figure 2:
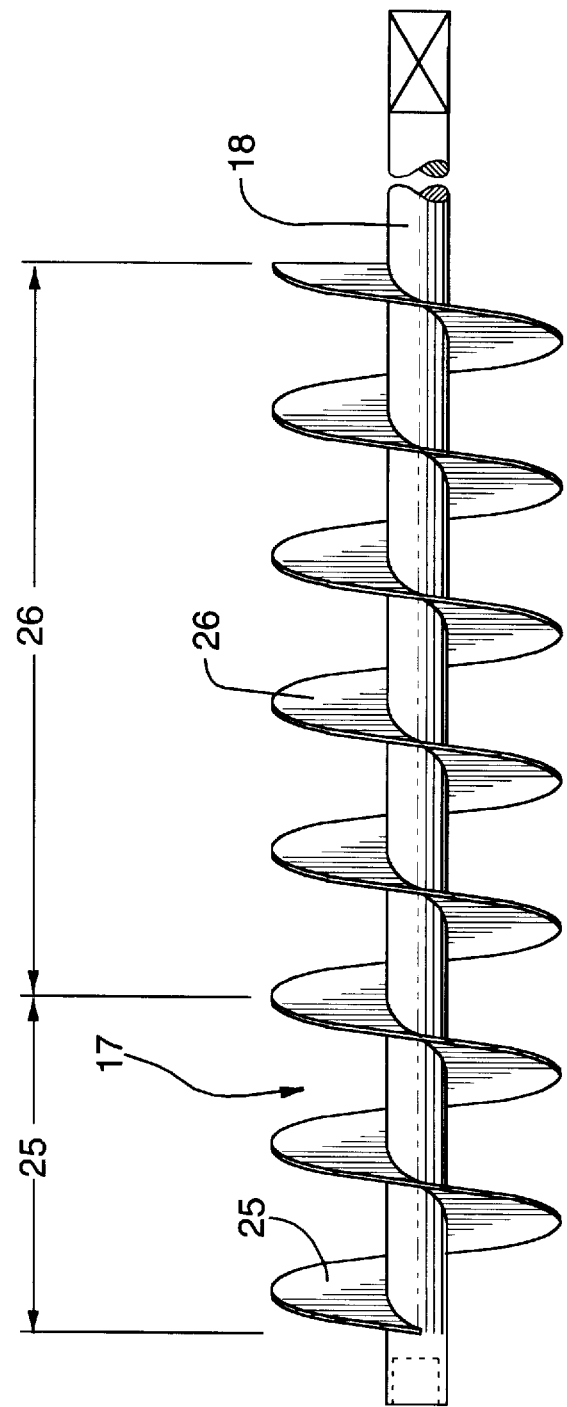
FIG. 2 is an enlarged longitudinal section of the auger of the screw press separator shown in FIG. 1.

DESCRIPTION OF PREFERRED EMBODIMENTS (i) Description of FIGS. 1 and 2

Depicted in FIGS. 1 and 2 is a screw press separator 10 for the conversion of a liquid/solids slurry into its constituent liquid and solid elements. The screw press separator 10 includes an inflow and control zone A, an initial feed and compression zone B, a liquid removal and compression zone C, and a solids discharge zone D.

A radial inlet pipe 15 affixed to cylindrical barrel 12 is provided for directly feeding the slurry into auger chamber 11 thus filling the auger space, and thence directly into the auger 17 to impinge upon and be taken up by, the flights generally indicated as 16, and also specifically as flights 25,26 of the auger 17. Any overflow is returned directly to the pit source of the slurry. It is preferred to agitate and mix the slurry before it is fed into the separator. In general, the slurry is normally fed by means of a rotating pump (not shown) in an amount which is preferably in excess of what is needed. The excess may be recycled by means of an overflow pipe (not shown) provided adjacent to the feeder. Thus, the screw press separator 10 receives influent slurry in a radial manner, which assists in having the influent slurry go directly to the auger 17, with no dead space in the auger chamber 11 of the screw press separator 10.

The auger 17 is mounted for rotation within the barrel 12 by means of a longitudinal shaft 18 rotatably-mounted in a sealed bearing 19, mounted in a main end plate 20. Shaft 18 is driven by a motor (not shown) attached to the shaft 18 and supported in a conventional manner on base 21.

Cylindrical barrel 12 includes a cylindrical separation chamber 22. Cylindrical separation chamber 22 incorporates a cylindrical strainer basket 23, preferably in the form of a longitudinally-slotted screen. While not essential, a concentric cylindrical mantle 24, which also includes a liquid withdrawal pipe 28, may be provided therearound. The auger 17 extends into the separation chamber 22 for substantially its entire length.

As seen in FIG. 2, the auger 17 includes an infeed series of flights 25 disposed in auger chamber 11. The flights 25 have a consistent pitch, and are of a selected first thickness. Although any reasonably necessary pitch will be useful, the pitch of the infeed flights will usually vary from about 4" to about 9", but is generally about 6" to about 8". The thickness of these auger flights generally may be about ¼".

The remaining flights 26, which are in the separation chamber 22, are of greater thickness than the infeed flights 25. The thickness of these auger flights 26 generally may be about ⅜" thick. The flights 25,26 are preferably of stainless steel.

As seen now in FIG. 1, the terminal end 27 of the auger 17 ends near the end of the cylindrical strainer basket 23, thereby providing the deliquifying zone "C". The liquid which is removed may be simply discarded, or may be withdrawn from mantle 24 via the liquid outlet pipe 28.

A cylindrical discharge chamber 29 is provided at the end of the cylindrical barrel 12. The discharge chamber 29 includes a support spider assembly, indicated schematically as 50 and a spring-loaded door, indicated schematically as 75.

Figure 3:
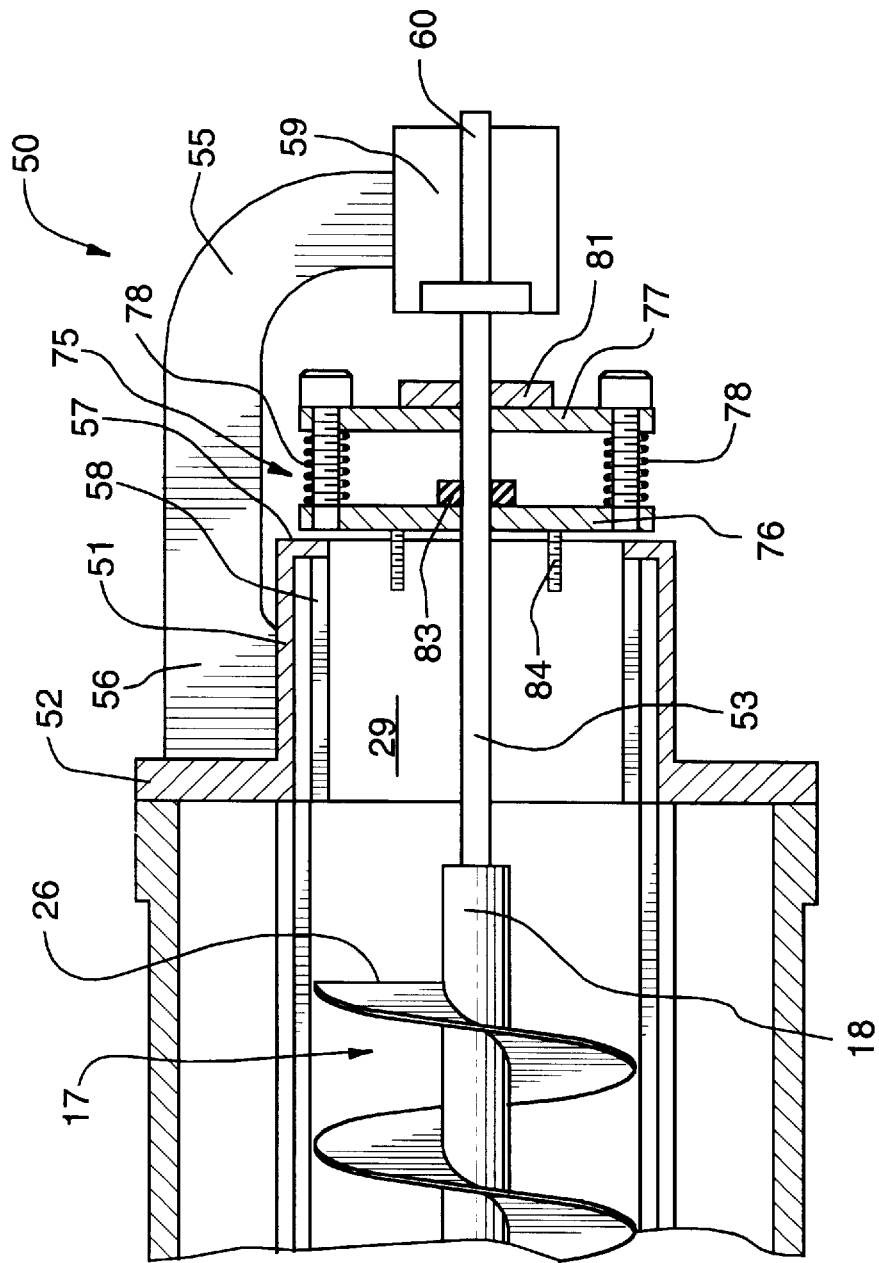
FIG. 3 is a partial, longitudinal section view of the end of the screw press separator showing the discharge chamber with the keystocks therein, and the spring-loaded door assembly with its disintegrating members thereon, in its blocking position.
Figure 4:
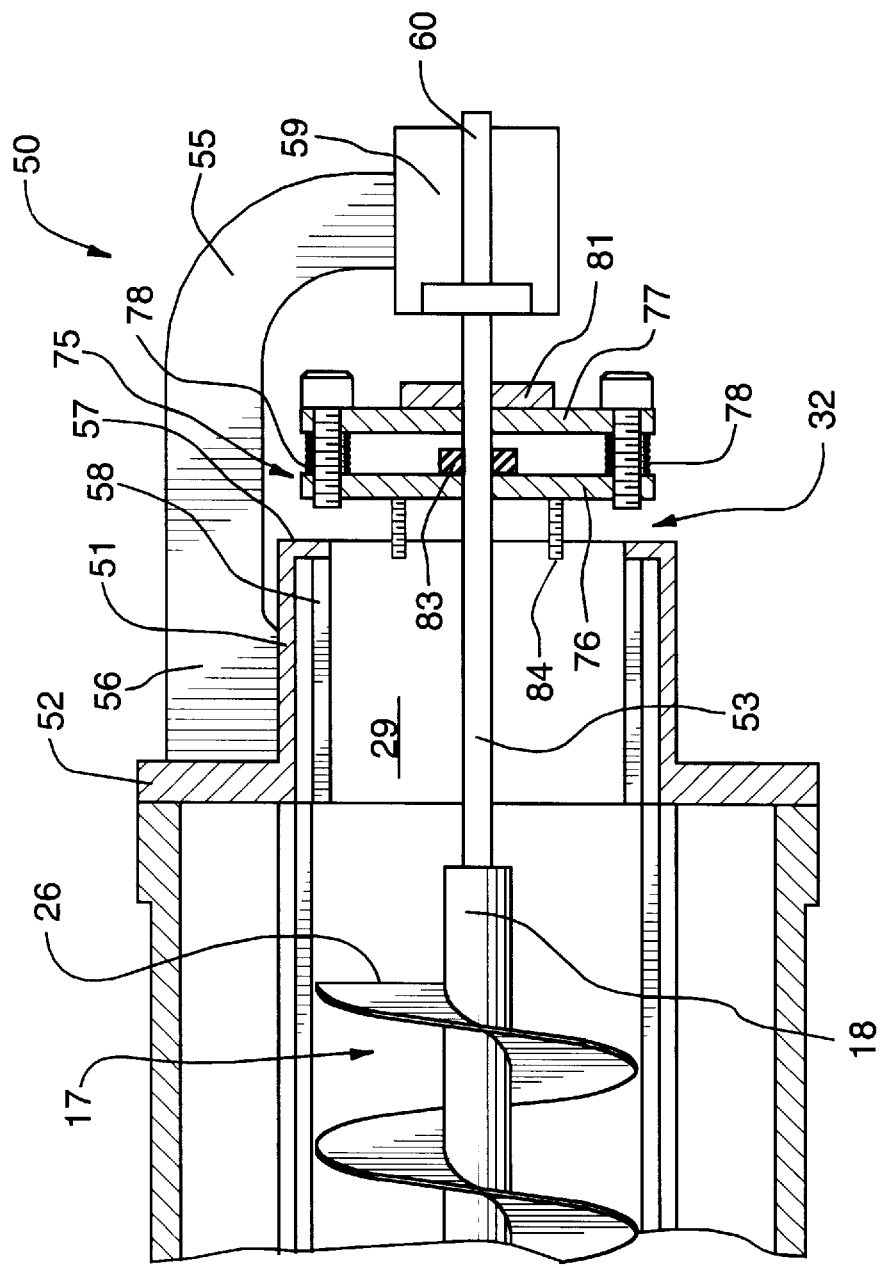
FIG. 4 is a partial, longitudinal section view of the end of the screw press separator showing the discharge chamber with the keystock therein, and the spring-loaded door assembly with its disintegrating members thereon, in its unblocked position.

(ii) Description of FIGS. 3 and 4

These assemblies are seen in more detail in FIGS. 3 and 4, as seen therein, the discharge chamber 29 is defined by a hollow, open-ended collar 51 provided with a flange 52, and an extension shaft 53 of the shaft 18 of the auger 17 passing therethrough.

A support frame 50 is secured to the flange 52, as by welding. The support frame 50 is in the form of a spider 55 having a plurality of forward, longitudinally-extending fingers 56. Only one such finger 56 is shown, but there may be three or more such fingers 56 equiangularly-disposed about the collar 51. An outer disc 57 providing the open-end of the collar 51 is used to install a plurality of axially-extending keystocks 58. The spider 55 supports a bearing 59 within which the terminus 60 of the extension shaft 53 is supported and is adapted to rotate.

The extension shaft 53 supports a spring-loaded door assembly 75. The spring-loaded door assembly 75 is situated at the solids discharge end 32 (see FIG. 4) of the discharge chamber 29. This spring-loaded door assembly 75 includes a pair of longitudinally-spaced-apart plates, namely an inner (upstream) plate 76 and an outer (downstream) plate 77. The plates are separated by a plurality of coil springs 78. The load on the coil springs 78 may be varied by suitable means known to those skilled in the art. Outer (downstream) plate 79 is secured by means of clamping block 81 to extension shaft 53 of the shaft 18 of the auger 17. The inner (upstream) plate 76 is slidably located with respect to extension shaft 53 by means of bushing 83 which is secured to the inner face of inner plate 78 and is also adapted to rotate along with the extension shaft 53. Inner plate 78 is also is provided with a plurality of longitudinally-extending tearing bolts 84 in its inner (upstream) face.

As thus seen in FIGS. 3 and 4, the discharge chamber 29 is provided with a plurality of internal, longitudinally-extending flutes or square cross-section, rectangular keystocks 58. As an example only, four of such keystocks 58 are welded at four locations 90° apart, with respect to the inner annulus of the discharge chamber 29. As one example only, the approximate dimensions of the keystocks 58 is approximately 4" in length and about ⅜" in cross-section. The function of the keystocks 58 is to retain the solid plug and to prevent such solid plug, which is formed by the auger 17, from rotating inside the discharge chamber 29 due to the rotation of the extension shaft 53. The egressing solid plug is disintegrated by means of the tearing or stripping bolts 84. In one example only, each such bolt 84 has an approximate dimension of 5¹³⁄₁₆" in length and about ¾" in diameter. The non-rotating plug egresses from the discharge chamber 29 and its solid consistency is destroyed by coming into contact with the moving stripping bolts 84. The pressure of the plug compresses inner plate 76 towards outer plate 77, as seen in FIG. 4, leaving an egress solids outlet door 32 between the end of the discharge chamber 29 and the beginning of the inner plate 76. Consequently, the solid fragments fall through the open egress door 32 and fall to the ground. Alternatively such solids may be collected by a conveyor belt (not shown) located immediately below the egress door 32 for transportation elsewhere.

It will be appreciated that, without the keystocks 58 and tearing bolts 84, the auger 17 would impart rotation to the solid plug. Such rotation would be augmented by the rotating door assembly 75. The screw press separator would then cease to operate, as the solid plug would be spinning in situ without removal of solid material.

The screen of the strainer basket 23 is preferably longitudinally-slotted of about one-quarter millimeter to about one millimeter in slot size and it is commercially-available. It is preferable to use such longitudinally-slotted screen as opposed to a type of screen which has apertured holes or the like. These apertured screens tend to catch solid elements, e.g., straw, in the slurry which the auger 18 cuts off, thus embedding the solid elements in the screen and tending to clog it and render it inoperable. With slots, the auger 18 tends to pull the solid elements back into the plug and out of engagement with the screen. The auger 18 within the strainer basket 23 extends radially to the screen of the strainer basket 23. Thus, the distance between the inner diameter of the strainer basket 23 and the outer diameter of the flights 26 of the auger 17 is small, e.g., about 0.020 to about 0.030". A close tolerance, e.g., plus or minus 0.010" is maintained for this distance.

EXAMPLE

In one example of operation, an aqueous manure slurry to be separated is typically pumped from a pit and arrives through a pipeline into the separator. It is also preferable to agitate the manure slurry in the pit. The aqueous manure slurry is introduced in excess and fills the separator. Any overflow is returned via by-pass piping to the pit. This, in return agitates the manure in the pit and inhibits sedimentation of the solids in the liquid manure slurry. At the commencement of a deliquifying operation, the spring-loaded door assembly, which rotates with the auger, is virtually closed to build up back pressure. Such back pressure establishes a dam for the liquid which is forced radially and outwardly out of the openings provided in the cylindrical strainer basket. The screw press auger in the separator into which the aqueous manure slurry is fed seizes a portion of the aqueous manure slurry corresponding to the intake capacity of the screw press and transports it in a self-regulating manner by means of the inflow flights of the auger to a separation chamber. A layer of solids adjacent to the housing wall passes into the separation chamber in the form of a growing filter cake and finally exits the auger as a solid plug filling the volume of the cylindrical discharge chamber.

The auger transports the solid plug through the separation basket to the discharge chamber, while the pressure is rising toward the terminal end of the auger due to the reaction created by the spring-loaded rear door assembly. During that stage, a dewatering of the solids accumulated in the plug occurs. The solids, which are densified due to the dewatering, are transported by the auger toward the terminal end of the auger, and are accumulated within the last screw turns and shaped into a plug. The increasing pressure leads to additional dewatering and deposition of solids onto the plug. This plug is moved to the cylindrical discharge chamber from the strainer basket. The plug travels along the screw shaft, the end of the shaft projecting forwardly past the discharge opening and being connected to the spring-loaded door assembly. Within the cylindrical discharge chamber, the keystocks prevent the plug from rotating, but permit it to apply pressure to the spring-loaded door assembly. Under the action of the pressure generated by the screw press, and the back pressure of the spring-loaded door, the plug produced in this manner is pushed to the discharge opening upstream plate of the spring-loaded door assembly and urges that door rearwardly to provide the egress opening. The plug is broken up by the tearing bolts located on such upstream plate of the rotating spring door. The pieces of the plug so formed, discharge through the egress opening.

CONCLUSION

More control of the liquid expressing procedure using the apparatus of this invention is provided due to the back pressure build-up. The spring-loaded rear door assembly enables selective control of the back pressure by applying compressive forces by means, well-known to those skilled in the art, without the need for any taper or wedge in the barrel.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A screw press separator for separating and deliquifying solids contained in solids-containing liquid slurry comprising:

a cylindrical housing;

a radial inlet means for the inflow of said solids-containing liquid slurry into an inflow space of said cylindrical housing;

a cylindrical strainer basket extending forwardly from said housing, said strainer basket having a cylindrical outlet end and apertured cylindrical walls for the passage of separated liquid therethrough;

a cylindrical discharge chamber extending rearwardly from said outlet end of said strainer basket and defining a solids discharge opening at a terminal end thereof, said cylindrical discharge chamber being provided with longitudinally-extending members serving to prevent a plug of solids situated therein from rotating;

an auger disposed in both said cylindrical housing and in said strainer basket, said auger including a shaft extending through said housing, through said strainer basket and through said cylindrical discharge chamber, and auger flights affixed to an outer periphery of said shaft, said auger flights beginning in said housing at a location communicating directly with said radial inlet means and terminating adjacent the terminus of said strainer basket;

a spring-loaded door assembly at the exit of said cylindrical discharge chamber, said door assembly being operatively-connected to said shaft of said auger so that said door assembly rotates with said shaft, the inner face of the upstream end of said door assembly being provided with a plurality of longitudinally-extending disintegrating members, said door assembly being movable between a blocking position in which it blocks said solids discharge opening, and an unblocking position in which it provides said discharge opening, said spring-loaded door assembly comprising two plates separated by a spring member which is fixed to said plates an upstream plate of said assembly being adapted to be slidable with respect to said shaft a downstream plate of said assembly being secured to said shaft; and a motor for driving said auger for advancing said solids-containing liquid slurry forwardly within said cylindrical housing and through said strainer basket to separate liquid through said strainer basket and to propel solids in the form of a solid plug into said cylindrical discharge chamber;

whereby said solid plug, which is so-formed, is then discharged in the form of discrete particles, by way of said spring-loaded door assembly at said solids discharge opening.

2. The screw press separator of claim 1 wherein there are plural spring members and said spring members are manually adjustable to vary an initial force compressive resistive force thereof to vary the extent to which said plug is compacted by said resistive force of said door assembly.

3. The separator of claim 1 wherein said longitudinally-extending members on said door assembly comprise a plurality of tearing bolts on the upstream face of said upstream plate.

4. The screw press separator of claim 3 wherein said flights of said auger abruptly increase in thickness at the intersection of the outlet from said flow space and the inlet to said cylindrical strainer basket.

5. A method for separating and deliquifying solids contained in solids-containing liquid slurry comprising the steps of:

A) introducing said slurry into a screw press separator, said screw press separator comprising a cylindrical housing, a radial inlet means for the inflow of said solids-containing liquid slurry into said cylindrical housing, a cylindrical strainer basket extending forwardly from said housing, said strainer basket having a cylindrical outlet end and apertured cylindrical walls for the passage of separated liquid therethrough, a cylindrical discharge chamber extending rearwardly from said outlet end of said strainer basket and defining a solids discharge opening at a terminal end thereof, said cylindrical discharge chamber being provided with longitudinally-extending members therein, an auger disposed in both said cylindrical housing and in said strainer basket, said auger including a shaft extending through said housing, through said strainer basket and through said cylindrical discharge chamber, and auger flights affixed to an outer periphery of said shaft, said auger flights beginning in said housing at a location communicating directly with said radial inlet means and terminating adjacent the terminus of said strainer basket, a spring-loaded door assembly at the exit of said cylindrical discharge chamber, said door assembly being operatively-connected to said shaft of said auger so that said door assembly rotates with said shaft, the inner face of said upstream end of said door assembly being provided with a plurality of longitudinally-extending disintegrating members, said door assembly being movable between a blocking position in which it blocks said solids discharge opening, and an unblocking position in which it provides said discharge opening, said spring-loaded door comprising two plates separated by a spring member which is fixed to said plates, an upstream plate of said assembly being adapted to be slidable with respect to said shaft, a downstream plate of said assembly being secured to said shaft, and a motor for driving said auger for advancing said solids-containing liquid slurry forwardly within said cylindrical housing and through said strainer basket to separate liquid through said strainer basket;

B) rotating said augur to advance said slurry into said strainer basket, thereby to separate liquid through said strainer basket and to propel solids in the form of a solid plug into said cylindrical discharge chamber;

C) preventing said solid plug on said cylindrical discharge chamber from rotating;

D) urging said plug to pass into said cylindrical discharge chamber to apply a predetermined force to said spring-loaded door assembly;

E) disintegrating said plug by means of said disintegrating members of said spring-loaded door assembly which is rotating along with the auger; and F) removing discrete solids through the space between the end of said cylindrical discharge chamber and the upstream force of the upstream end of said rotating spring-loaded door assembly.

6. The method of claim 5 including the steps of:

G) providing said spring-biassed door with spring member for controllably moving said door between a blocking position in which it blocks said solids discharge opening, and an unblocking position in which it provides said solids discharge opening;

H) biasing said door toward said blocking position by means of said spring member; and I) adjusting said spring member to vary an initial compressive force applied by said door assembly to said plug to vary the extent to which said plug is compacted.

* * * * *